United States Patent Office 3,043,873
Patented July 10, 1962

3,043,873
PROCESS FOR THE PREPARATION OF SALTS OF TRICHLORACETIC ACID
Fernand Peto, Le Pecq, Seine-et-Oise, and Marc L. J. Girard, Le Villard, Bozel, Savoie, France, assignors to Nobel-Bozel, Paris, France, a company of France
No Drawing. Filed Nov. 9, 1959, Ser. No. 851,557
Claims priority, application France Nov. 21, 1958
6 Claims. (Cl. 260—539)

It is known that the manufacture of salts of trichloracetic acid in powdered form by neutralisation of trichloracetic acid in an aqueous medium followed by elimination of the water presents serious difficulties owing to the great sensitivity of the acid and its salts with respect to the reagents.

In fact, in the presence of water and a base, especially with slight heating, free or even combined trichloracetic acid decomposes readily into chloroform and carbon dioxide according to reactions of the type:

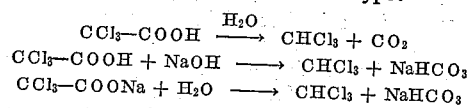

The current practice is to endeavour to avoid the harmful action of the base, at the time of neutralisation, by adding an aqueous solution of a base, for example, caustic alkali or alkali carbonate, to an aqueous solution of trichloracetic acid, this basic solution being relatively dilute in order not to produce, at any instant during its addition a pH greater than 7 in the reaction medium.

On the other hand, the temperature must not exceed 30 to 40° C. during the neutralisation; in fact, the reaction mixture is particularly sensitive to decomposition by the action of heat, which necessitates very strict supervision and perfectly adapted working conditions.

This sensitivity to temperature becomes a still greater difficulty when it is a question of concentrating the solution in order to obtain the solid salt. Evaporation of the water under vacuum, at a moderate temperature, can be considered; such a process, however, does not result in the production of a commercially useful trichloracetic acid salt since there is a production of hydrated crystalline salts, which it is impossible to transform into dry powder. In the case of the sodium salt, for example, there is obtained crystalline sodium trichloracetate with three molecules of water. This is a hygroscopic and unstable compound which dissolves in its water of crystallisation and which it is impossible to dehydrate by conventional technical processes. Concentration of the solution by atomisation may also be attempted, but, in this case, the trichloracetate obtained, although dry, has a particular physical structure which is very prejudicial to its commercial value. The salts thus formed have a strong tendency to caking even out of contact with the air.

It is not possible, on the other hand, according to the observations of the applicant, to perform the neutralisation of the trichloracetic acid in the absence of water, for example by mixing the crystalline acid in a ball mill with the anhydrous base, for example sodium carbonate. In fact the efficiency of the neutralisation is very poor under these conditions; in addition, the crystals of the trichloracetic acid become coated with a layer of salt which protects them from the action of the base still present. Moreover, in the ball mill the product becomes plastic, which also renders impossible the completion of the neutralisation.

In the present state of the art therefore, the problem appears to be insoluble; on the one hand there is the impossibility of obtaining satisfactory yields by working in the absence of water and on the other hand there is the impossibility of obtaining a salt with a suitable physical structure by working in the presence of water.

Now, contrary to all expectation, the applicant has found that it is possible to eliminate all these difficulties by performing the neutralisation of the trichloracetic acid in the presence of a certain limited and well-defined proportion of water, the sequence of operations being carried out under simple conditions and in a continuous manner if desired, with known industrial-chemical apparatus; the product obtained then has a physical structure quite suitable for its industrial uses.

A feature of the present invention resides in the use, for the manufacture of powdered salts of trichloracetic acid, of a mixture of trichloracetic acid and water, in which the proportion of water is from 6 to 12 kgs. per 100 kgs. of trichloracetic acid.

The neutralisation is effected by means of a free or carbonated, preferably anhydrous, base in substantially stoichiometric proportion with respect to the acid, at a temperature not exceeding 90° C., preferably lower than 60° C., so as to obtain a thick paste of very fine particles having a pH between 6 and 8.

This paste is mixed with dry trichloracetate coming from a previous operation (or with recycled dry trichloracetate if it is a continuous process) so as to give a moist powder, the proportion of dry trichloracetate used being such that the total water content of the moist powder obtained is less than 7%, by weight, taking into account the water of the reaction.

The moist powder is dried and simultaneously the lumps thereof are broken at a temperature not exceeding 80° C.

There is obtained in this way, with a practically quantitative yield, a powdered trichloracetate of perfect physical structure, which is fairly heavy and does not have any tendency to cake.

For carrying out the process, the trichloracetic acid and the additional water may be introduced, for example, into a feed tank.

The neutralisation by the base is preferably effected in a suitable mixer, for example a turbo-mixer.

The thick paste obtained is delivered to a stone mill or other similar mill for the purpose of crushing all the particles and completing the reaction. At the outlet of the mill the pH of the paste may be measured and adjusted by varying the acid feed.

The moist powder obtained after mixing of the thick paste with the dry trichloracetate is delivered to a drier-conveyor for example of the type known in commerce under the name "Holoflite," i.e., a drier with double walls and a double helicoidal screw, in which steam or hot water circulates, the interior of the apparatus being under a vacuum equal to or exceeding 500 mms. of mercury.

Since the upper limits of the temperature which are not to be exceeded are relatively high compared with the normal temperature limits, the supervision of the installation is greatly facilitated.

The technical progress achieved by the present process can therefore be summarised as follows:

It is a simple process which can be carried on continuously;

Known industrial-chemical apparatus may be used for the process;

It has high upper temperature limits, which facilitate supervision of the process;

The product is of perfect physical structure;

Practically quantitative yields are obtained.

The following example will facilitate an understanding of the invention, although the invention is not limited to the example.

Example

Into a tank, provided with a circulating pump, there are introduced per hour 50 kgs. of crystalline, anhydrous trichloracetic acid, of 97% by weight purity and 3.5 litres of water. The temperature of the mixture is maintained between 25° and 30° C. by slight heating. By means of the circulation pump this mixture is delivered to another tank in which the level is kept constant, from which a flow of liquid, adjusted to about 31 litres per hour, runs into a mixer. To the latter, there are also delivered 16.5 kgs. of anhydrous sodium carbonate per hour, this quantity being regulated by a metering device; the mixer is jacketted and cooled to 50° C. The thick paste formed in the mixer passes through a stone mill at the outlet of which the electrode of a pH meter acts on a relay operating a valve for the regulation of the flow of the trichloracetic acid. The paste leaving the stone mill is mixed with 50% of dry trichloracetate recycled from the outlet of a subsequent drier. The mixture passes through a second mixer then through a metering device and the moist powder which leaves the latter then enters a drier of the type known in commerce under the name "Holoflite" where it is dried at 60° C. under a vacuum of from 600 to 700 mms. of mercury. At the drier outlet a metering device similar to the one at the inlet side of the drier, discharges 113 to 114 kgs./hour of anhydrous sodium trichloracetate at about 94%, of which half is recycled between the first and second mixers. There are thus obtained from 56.5 to 57 kgs. per hour of the finished product which is in the form of a powder having an apparent density of 1, and which has a perfect physical structure and does not have any tendency to cake.

The invention is applicable in a general way to the production of metallic salts or even organic salts of trichloracetic acid.

What we claim is:

1. A continuous process for the production of an alkali metal salt of trichloracetic acid, which comprises mixing trichloracetic acid, a base selected from the group consisting of caustic alkali and alkali carbonate in substantially stoichiometric proportion with respect to said acid, and water in an amount of from 6 to 12% by weight with respect to said acid, maintaining the reaction mass at a temperature not exceeding 90° C. to obtain a thick paste having a pH between 6 and 8, further admixing said paste with an amount of dry trichloracetate of the same alkali metal such that the total water content in the moist powder thus obtained is less than 7% by weight, and crushing said moist powder at an elevated temperature which is not above 80° C. so as simultaneously to dry the same and break the lumps therein.

2. The process of claim 1 wherein said temperature is maintained below 60° C.

3. The process of claim 1 wherein said trichloracetic acid is mixed with alkali carbonate.

4. The process of claim 1 in which the base is anhydrous.

5. A continuous process for the production of a powdered, alkali metal salt of trichloroacetic acid, which comprises feeding trichloracetic acid, a material selected from the group consisting of caustic alkali and alkali carbonate in substantially stoichiometric proportion with respect to said acid, and water in an amount of from 6 to 12% by weight with respect to said acid, to a first mixing zone; cooling said first mixing zone to maintain the temperature therein at a level not above 90° C.; discharging from said first mixing zone a pasty effluent having a pH between 6 and 8; feeding to a second mixing zone the pasty effluent from said first zone, and dry trichloracetate of the same alkali metal by such an amount that the total water content in the mixture formed in said second mixing zone is less than 7% by weight; and passing the moist powdery effluent from said second mixing zone through a drying zone at a temperature which is not above 80° C.

6. The process of claim 5, which comprises recycling a portion of the dry powdery effluent from said drying zone as a dry trichloracetate feed to said second mixing zone.

References Cited in the file of this patent

FOREIGN PATENTS 706,440     Great Britain ---------- Mar. 31, 1954